United States Patent Office 2,722,532
Patented Nov. 1, 1955

2,722,532

4b-METHYL DODECAHYDROPHENANTHRENES AND PREPARATION THEREOF

Glen E. Arth, Cranford, George I. Poos, North Plainfield, and Lewis H. Sarett, Princeton, N. J., assignors to Merck & Co., Inc., Rahway, N. J., a corporation of New Jersey No Drawing. Application June 14, 1952,
Serial No. 293,672

16 Claims. (Cl. 260—340.9)

This invention is concerned with novel polyhydrophenanthrene compounds, and processes for preparing the same; more particularly it relates to 4b-methyl-1,2,3,4,4a,4b,5,6,7,9,10,10a - dodecahydrophenanthrene - 1,4,7-trione, derivatives thereof, and processes for obtaining the same.

This application is a continuation-in-part of our copending application, Serial No. 263,015, filed December 22, 1951, now abandoned.

The novel 4b-methyl dodecahydrophenanthrene compounds of our invention of the formula

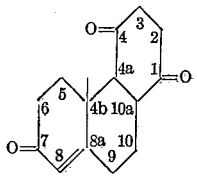

and derivatives thereof, are useful in the total synthesis of steroid compounds and in the preparation of other valuable polyhydrophenanthrene compounds. These novel compounds have three fused carbon rings corresponding to rings A, B, and C of steroidal compounds, and an angular methyl group at position 4b corresponding to the angular methyl group at position 10 in various steroids.

It is an object of our invention to provide 4b-methyl-1,2,3,4,4a,4b,5,6,7,9,10,10a - dodecahydrophenanthrene - 1,4,7-trione compounds and derivatives thereof. It is a further object to provide processes for preparing these new compounds from 4b-methyl-1,2,3,4,4a,4b,5,6,7,9,10,10a - dodecahydrophenanthrene - 1,4 - diol - 7 - one (I). Other objects will be apparent from the detailed description hereinafter provided.

In accordance with one embodiment of our invention, we have found that one stereoisomeric form of the product 4b - methyl - 1,2,3,4,4a,4b,5,6,7,9,10,10a - dodecahydrophenanethrene-1,4,7-trione (XI) can be prepared by the following reactions:

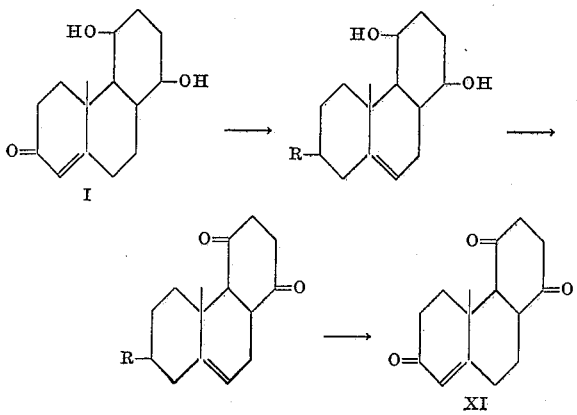

wherein R is a substitutent convertible to a keto substituent by hydrolysis.

In this process, the 7-keto substituent of the starting material, Compound I, is first blocked or protected by forming a suitable derivative, such as an enol ether or preferably a ketal, which can be readily hydrolyzed to obtain the starting compound. This derivative of Compound I is then oxidized to convert the hydroxy substituents to keto groups, and the resulting oxidized product can be hydrolyzed to obtain Compound XI. In the preparation of the ketal derivative the double bond shifts from the 8,8a position to the 8a,9 position. Hydroylsis of the ketal derivative to the 7-keto compound results in the shifting of the double bond again, and it returns to the 8,8a position.

In our preferred method of carrying out this process, Compound I is first converted to the corresponding 7-ethylenedioxy derivative, and this compound is then oxidized and finally hydrolyzed to obtain Compound XI as follows:

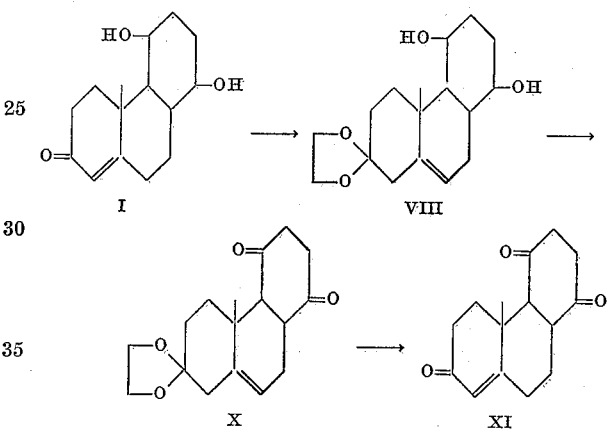

The derivative, 4b - methyl - 7 - ethylenedioxy - 1, 2, 3,4,4a,4b,5,6,7,8,10,10a - dodecahydrophenanthrene - 1,4 - diol (VIII) is readily prepared by heating Compound I with glycol in the presence of an acid catalyst, such as p-toluene sulfonic acid. The reaction is preferably carried out in a suitable inert solvent medium, for example, ethylene dichloride. It is conveniently effected by heating a mixture of Compound I, glycol, ethylene dichloride and p-toluene sulfonic acid, and distilling off the water of reaction formed as an ethylene dichloride azeotrope. Upon completion of the reaction, the ethylenedioxy derivative of Compound I, Compound VIII, is recovered by evaporating the solution and crystallizing the product from a suitable solvent such as acetone.

Compound VIII can then be treated with an oxidizing agent to oxidize the hydroxy groups to keto substituents, and form 4b-methyl-7-ethylenedioxy-1,2,3,4,4a,4b,5,6,7,8,-10,10a-dodecahydrophenanthrene-1,4-dione. Thus Compound VIII can be oxidized by reaction with a metal alkoxide in the presence of a suitable ketone. We have found that this oxidation step is most readily carried out in the presence of an inert organic solvent (inter alia, benzene, toluene, dioxane, and the like). The reaction is conveniently effected by dissolving Compound VIII in a mixture of a ketone and the organic solvent, adding a metal alkoxide thereto and warming the reaction mixture. Suitable ketones which may be used in this reaction include acetone, methyl ethyl ketone, cyclohexanone, benzil and p-benzoquinone. We have found that the reaction is most conveniently effected using cyclohexanone as the ketone, benzene as the inert solvent and aluminum isopropoxide as the metal alkoxide. After the reaction is complete, the oxidized product can be recovered by adding water to the reaction mixture, filtering to remove the precipitated metal hydroxide, concentrating the filtrate to dryness, triturating the residue with petroleum ether, and recovering Compound X from this solvent. Alternatively, Compound VIII can be oxidized to Compound X by reacting it with pyridine-chromium trioxide complex in a pyridine medium. After the oxidation is complete, Compound X is obtained by diluting the reaction mixture with water, extracting with a mixture of benzene and ether, concentrating to dryness, chromatographing the residue so obtained over alkaline alumina, and eluting the product from the alumina with benzene.

When Compound VIII is oxidized in accordance with the procedures described above, there is also obtained along with Compound X, the incompletely oxidized compounds, 4b-methyl-7-ethylenedioxy-1,2,3,4,4a,4b,5,6,7,8,-10,10a-dodecahydrophenanthrene-1-one-4-ol (IX), and 4b-methyl - 7 - ethylenedioxy - 1,2,3,4,4a,4b,5,6,7,8,10,10a-dodecahydrophenanthrene-1-ol-4-one (XVII) having the formulas

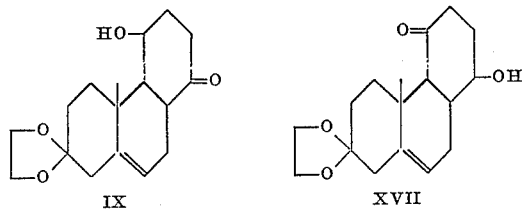

These compounds may be oxidized further by the processes described above to obtain Compound X. Alternatively, the compounds may first be hydrolyzed with acid to convert the 7-ethylene-dioxy substituent to a keto group, and the resulting diketo compound can then be oxidized to obtain Compound XI. Thus, in accordance with this embodiment of our invention, Compound XVII may be converted to Compound XI by the following process.

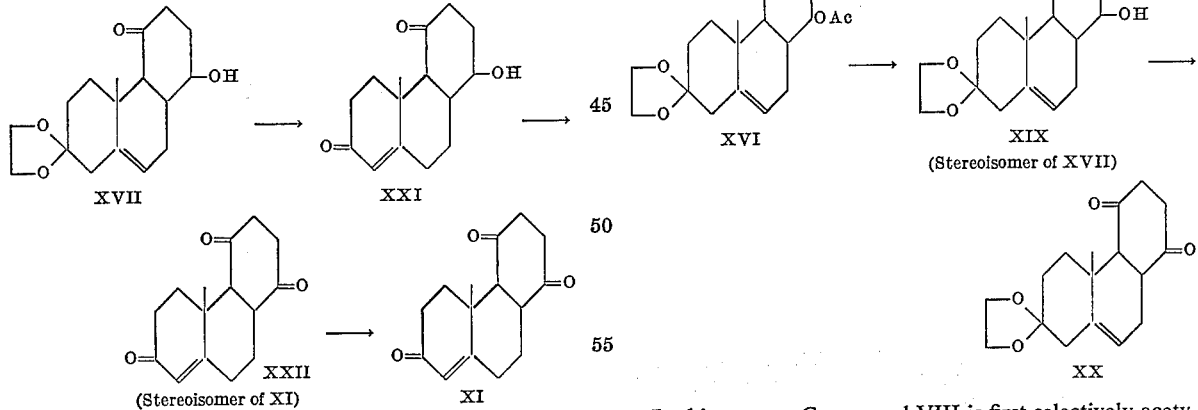

Pursuant to this process, Compound XVII is first hydrolyzed by heating with acid to obtain 4b-methyl-1,2,3,-4,4a,4b,5,6,7,9,10,10a-dodecahydrophenanthrene-1-ol-4,7-dione (XXI). The latter compound on treatment with chromium trioxide is oxidized to obtain 4b-methyl-1,2,3,-4,4a,4b,5,6,7,9,10,10a - dodecahydrophenanthrene - 1,4,7-trione (XXII) which is a stereoisomeric modification of Compound XI melting at about 164–166° C. Compound XXII on treatment with a base, such as alkaline alumina, is converted to the stereoisomeric form, Compound XI, melting at about 117–117.5° C.

In the process of oxidizing Compound VIII with a metal alkoxide in the presence of a ketone described above, an inversion at the B/C ring junction occurs resulting in the formation of Compounds X and IX which have a different B/C ring junction than that of Compound VIII. Thus, Compound IX is converted to Compound XI by the following process:

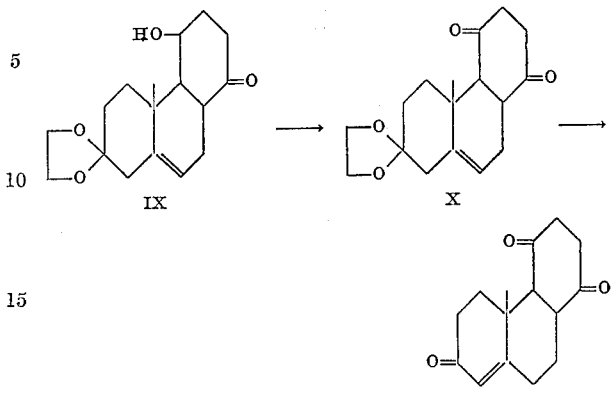

Compound IX is treated with pyridine-chromium trioxide complex in pyridine solution, as described above, to obtain Compound X, which on hydrolysis with acid is converted to Compound XI.

In accordance with a further embodiment of our invention, 4b-methyl-7-ethylenedioxy-1,2,3,4,4a,4b,5,6,7,8,10,-10a-dodecahydrophenanthrene-1,4-dione (XX), a stereoisomeric modification of Compound X, is obtained by the following process:

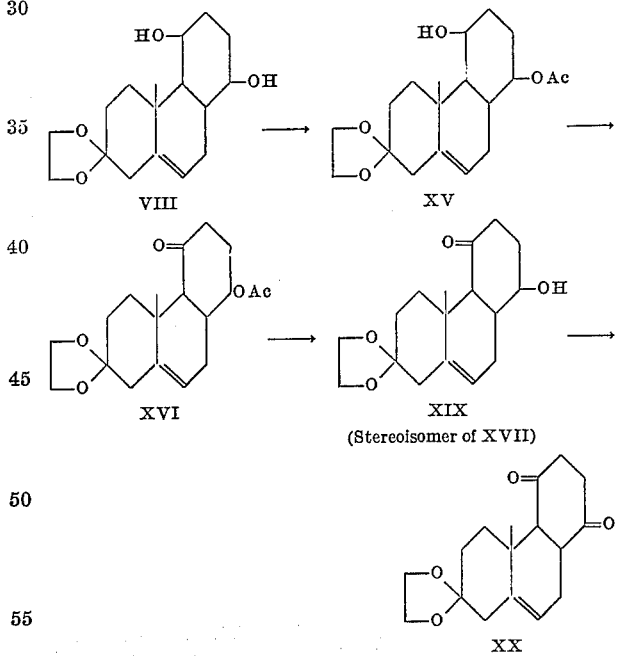

In this process Compound VIII is first selectively acetylated, for example, by reacting a pyridine solution of VIII with acetic anhydride, to form 4b-methyl-7-ethylenedioxy-1,2,3,4,4a,4b,5,6,7,8,10,10a - dodecahydrophenanthrene-1,4-diol-1-acetate (XV). The latter compound is then treated with an oxidizing agent such as pyridine-chromium trioxide to obtain 4b-methyl-7-ethylenedioxy-1,2,3,4,4a,-4b,5,6,7,8,10,10a-dodecahydrophenanthrene-1-ol-4-one-1-acetate (XVI) which is readily converted to the corresponding 1-hydroxy compound (XIX) by hydrolysis with an alkali such as potassium carbonate.

In this process of hydrolyzing Compound XVI, we have found that either Compound XVII or a stereoisomeric form thereof, namely, Compound XIX, is produced depending upon the particular conditions under which the hydrolysis is effected. Under relatively mild conditions employing moderate amounts of potassium carbonate Compound XVII results, while when a larger quantity of potassium carbonate and/or more strenuous conditions such as a prolonged reaction period are used, the stereoisomeric form, Compound XIX, is obtained. This Compound XIX apparently has a different B/C ring configuration than that of Compound XVII.

When Compound XIX is oxidized further, for example, by treatment with pyridine-chromium trioxide complex, 4b-methyl-7-ethylenedioxy-1,2,3,4,4a,4b,5,6,7,8,10,-10a-dodecahydrophenanthrene-1,4-dione (XX), a stereoisomer of X, is obtained. This stereoisomer, Compound XX, is found to melt at about 171–172° C. in contrast to Compound X which exhibits a melting point of about 120–121° C. On hydrolyzing Compound XX with acid, there is obtained a stereoisomeric form of 4b-methyl - 1,2,3,4,4a,4b,5,6,7,9,10,10a - dodecahydrophenanthrene-1,4,7-trione which is different from Compounds XI and XXII which have been described above.

It will be readily apparent to those skilled in the art that in place of utilizing Compound VIII in this synthesis, other suitable derivatives wherein the 7-keto group is protected by the formation of other ketals or enol ether derivatives can be used. Similarly, in place of using acetic anhydride as the acylating agent, other acylating agents may also be employed.

Compound I, utilized as the starting material in the present invention, is a new compound which may be prepared by reacting 5-methyl-perhydronaphthalene-1,4-diol-6-one with methyl vinyl ketone in the presence of an alkaline condensing agent, such as a strong base (inter alia, an alkali metal hydroxide and the like). This process is described in copending application Serial No. 228,126, filed May 24, 1951, now U. S. Patent 2,617,828.

The 5-methyl-perhydronaphthalene-1,4-diol-6-one used as the starting material in the preparation of Compound I is prepared as follows:

β-Ethoxy-propionaldehyde is reacted with ethyl magnesium bromide to produce 1-ethoxy-3-hydroxy-pentane which is oxidized with chromic acid to form 1-ethoxy-3-keto pentane, the latter compound is treated with ethyl ortho-formate and ethanol in the presence of hydrogen chloride to produce 1,3,3-triethoxy-pentane which upon reaction with hot potassium bisulfate is converted to 3-ethoxy-1,3-pentadiene; this product is then reacted with benzoquinone in accordance with the Diels-Alder condensation procedure to produce 5-methyl-6 - ethoxy - 1,4,4a,5,8,8a - hexahydronaphthalene - 1,4 - dione which on reaction with hydrogen in the presence of Raney nickel catalyst forms 5-methyl-6-ethoxy-1,2,3,-4,4a,5,8,8a-octahydronaphthalene-1,4-dione; the latter product is then treated with lithium aluminum hydride to form the corresponding diol, 5-methyl-6-ethoxy-1,2,-3,4,4a,5,8,8a-octahydronaphthalene-1,4-diol which is hydrolyzed to produce 5-methyl-6-keto-perhydronaphthalene-1,4-diol. These reactions are described in detail in a copending application of one of the present applicants, Serial No. 216,109, filed March 16, 1951.

Portions of the novel subject matter disclosed but not claimed herein are claimed in our copending applications, Serial No. 286,808 and Serial No. 290,826 filed May 8, 1952, and May 29, 1952, respectively. The following examples are presented as illustrative of our invention.

EXAMPLE 1

Preparation of 4b-methyl-7-ethylenedioxy-1,2,3,4,4a,4b,-5,6,7,8,10,10a - dodecahydrophenanthrene - 1,4 - diol (VIII)

Into a 5 liter flask equipped with a stirrer, a 1 liter dropping funnel and a sidearm with condensor attached in distilling position, were placed 38.9 g. (0.155 mole) of 4b-methyl-1,2,3,4,4a,4b,5,6,7,9,10,10a-dodecahydrophenanthrene-1,4-diol-7-one (I), 40 cc. (0.645 mole) of glycol, 2,500 cc. of ethylene dichloride and 0.4 g. (0.002 mole) of p-toluene-sulfonic acid. This mixture was set stirring. Enough heat was applied to distill off 3 liters of the azeotrope of the solvent and water, formed as a by-product, during a 3-hour period. During this time an additional 1,500 cc. of ethylene dichloride was added to keep the reactants in solution. After 3 hours the reaction mixture was cooled and thoroughly shaken with 50 cc. of an aqueous 1 Normal potassium bicarbonate solution. The aqueous carbonate layer was drawn off and twice extracted with ethylene dichloride. All three ethylene dichloride extracts were then combined, dried over anhydrous magnesium sulfate and concentrated. This concentrate was taken up in 1 liter of acetone and concentrated until crystals just began to come out. Filtration of the cold acetone gives the crude crystalline product 4b-methyl-7-ethylenedioxy-1,-2,3,4,4a,4b,5,6,7,8,10,10a - dodecahydrophenanthrene - 1,4-diol which can be further purified by recrystallization from acetone. The pure product melts at 189° C.

EXAMPLE 2

Preparation of 4b - methyl-7-ethylenedioxy-1,2,3,4,4a,4b,-5,6,7,8,10,10a-dodecahydrophenanthrene - 1 - one - 4 - ol (IX) and 4b-methyl-7-ethylenedioxy-1,2,3,4,4a,4b,-5,6,7,8,10,10a - dodecahydrophenanthrene - 1,4 - dione (X)

Eighty-six and five-tenths grams (0.294 mole) of 4b-methyl - 7 - ethylenedioxy - 1,2,3,4,4a,4b,5,6,7,8,10,-10a-dodecahydrophenanthrene-1,4-diol was dissolved in 2,130 g. (2,250 cc.) (21.7 moles) of cyclohexanone, and 2,250 cc. of benzene. To this solution was added 86.5 g. (0.424 mole) of aluminum isopropoxide, and the whole was then set to reflux for 12 hours. At the end of this time 25 cc. of water was added. The coagulated aluminum hydroxide thus formed was filtered off. The filtrate was then concentrated and dried in vacuo, leaving a residue which, on trituration with petroleum ether, gave the crude crystalline product 4b-methyl-7-ethylenedioxy - 1,2,3,4,4a,4b,5,6,7,8,10,10a - dodecahydrophenanthrene-1-one-4-ol. It can be purified by recrystallization and melts at 219–220° C.

The petroleum ether washes, used in the trituration, contain the product 4b-methyl-7-ethylenedioxy-1,2,3,4,-4a,4b,5,6,7,8,10,10a - dodecahydrophenanthrene - 1,4 - dione. It can be purified by recrystallization and melts at 120° C.

EXAMPLE 3

Preparation of 4b-methyl-1,2,3,4,4a,4b,5,6,7,9,10,10a-dodecahydrophenanthrene-1,4,7-trione (XI)

To a solution of 0.434 g. (0.0015 mole) of 4b-methyl-7 - ethylenedioxy - 1,2,3,4,4a,4b,5,6,7,8,10,10a - dodecahydrophenanthrene-1,4-dione (X) in 10 cc. of methanol was added 1 cc. of 2.5 Normal hydrochloric acid. After refluxing this acidic solution for 2½ hours, 8 cc. of water was added. All the methanol was then distilled and the resulting suspension extracted three times with chloroform. The three extracts were combined, dried over anhydrous magnesium sulfate and concentrated to give the crude product which was purified by chromatography over alumina. The desired product was eluted with a mixture of ether and chloroform. The pure 4b-methyl-1,2,3,4,4a,4b,5,6,7,9,10,10a - dodecahydrophenanthrene-1,4,7-trione melts at 117° C.

EXAMPLE 4

Preparation of 4b-methyl-7-ethylenedioxy-1,2,3,4,4a,4b,5,6,7,8,10,10a-dodecahydrophenanthrene - 1,4-dione (X) by the chromium trioxide-pyridine oxidation of Compound IX A solution of 3.12 g. of 4b-methyl-7-ethylenedioxy-1,2,3,4,4a,4b,5,6,7,8,10,10a - dodecahydrophenanthrene-1-one-4-ol (IX) in 30 cc. of pyridine was combined with 3.1 g. of chromium trioxide in 30 cc. of pyridine. The reaction flask was stoppered, the contents mixed thoroughly and allowed to stand at room temperature overnight. The reaction mixture was poured into water and extracted with three portions of benzene-ether (1:1) with filtration through diatomaceous earth to break the emulsions. After washing with water, the combined organic solution was dried over anhydrous magnesium sulfate and concentrated with final drying of the residue under high vacuum. Crystallization from ether gave Compound X, M. P. 117–121° C.

EXAMPLE 5

*Preparation of 4b-methyl-7-ethylenedioxy-1,2,3,4,4a,4b,5, 6,7,8,10,10a - dodecahydrophenanthrene - 1,4 - diol-1,4-diacetate (XIV)*

Thirty milligrams of Compound XIII in a mixture of 1 ml. of pyridine and 0.5 ml. of acetic anhydride was kept at 100° C. for ten minutes. After cooling, diluting with water and extracting with chloroform, there was obtained Compound XIV, M. P. 160–165° C. The pure Compound XIV melted at 163–165° C. after several recrystallizations from ether-petroleum ether mixture.

EXAMPLE 6

*Preparation of 4b-methyl-7-ethylenedioxy-1,2,3,4,4a,4b,5, 6,7,8,10,10a - dodecahydrophenanthrene - 1,4 - diol - 1-acetate (XV)*

A solution of 2.00 g. of Compound VIII in 20 cc. of dry pyridine and 10 cc. of acetic anhydride was kept at 100° C. for ten minutes. Excess acetic anhydride was hydrolyzed with ice water, and the reaction mixture was diluted to 100 cc. The crystalline product was collected on a filter, washed thoroughly with water and dried. A sample recrystallized twice from acetone yielded pure Compound XV melting at 183.5–184° C.

EXAMPLE 7

*Preparation of 4b-methyl-7-ethylenedioxy-1,2,3,4,4a,4b,5, 6,7,8,10,10a - dodecahydrophenanthrene - 1 - ol - 4-one-1-acetate (XVI)*

Two grams of chromium trioxide was dissolved in 20 cc. of dry pyridine with cooling. To the resulting suspension of orange complex was added a solution of 2.00 g. of Compound XV in 20 cc. of dry pyridine. The reaction flask was stoppered, the contents were mixed thoroughly by agitation and allowed to stand overnight. The reaction mixture was poured into 100 cc. of water and extracted with three 100 cc. portions of benzene. Filtration of the emulsions through diatomaceous earth was necessary to obtain separation of the extracts. The benzene solutions were combined, washed with water, dried over anhydrous magnesium sulfate and concentrated. After drying under high vacuum to remove pyridine, the residue was crystallized from ether. Two recrystallizations from ether gave Compound XVI melting at 143–144.5° C.

EXAMPLE 8

*Preparation of 4b-methyl-7-ethylenedioxy-1,2,3,4,4a,4b,5, 6,7,8,10,10a - dodecahydrophenanthrene - 1 - ol - 4-one (XVII)*

A solution of 0.726 g. of Compound XVI in 10 cc. of 0.25 N potassium carbonate in 75% methanol was refluxed for twelve minutes. Water was added and the methanol was removed in vacuo. Organic material was collected in chloroform and the chloroform solution was dried and evaporated to yield a crystalline product, M. P. 137–140° C. On recrystallization from ether, Compound XVII was obtained, melting at 142–143° C.

A mixture with starting acetate melted below 130° C.

Upon passage over alkaline alumina, Compound XVII was recovered unchanged.

Acetylation with acetic anhydride-pyridine by the standard procedure gave the acetate precursor Compound XVI.

EXAMPLE 9

*Preparation of 4b-methyl-7-ethylenedioxy-1,2,3,4,4a,4b,5, 6,7,8,10,10a - dodecahydrophenanthrene - 1,4 - dione (XVIII) and 4b-methyl-7-ethylenedioxy-1,2,3,4,4a,4b, 5,6,7,8,10,10a - dodecahydrophenanthrene - 1,4 - dione (X), a stereoisomeric form of XVIII*

A solution of 0.182 g. of Compound XVII in 2 cc. of pyridine was oxidized with 0.20 g. of chromium trioxide in 2 cc. of pyridine at room temperature overnight. After dilution with water and extraction with benzene, there was obtained a non-crystalline product. On standing, an ether solution of this material deposited crystals, M. P. 135–145° C.

Several recrystallizations from ether yielded Compound XVIII, M. P. 146–8° C.

The first ether mother liquor was passed over alkaline alumina. Compound X, M. P. 118–119.5° C. was obtained; mixed melting point with another sample of Compound X, 118.5–120° C.

EXAMPLE 10

*Preparation of compounds X, IX, XVII and XVIII by the chromium trioxide-pyridine oxidation of Compound VIII*

Three grams of 4b-methyl-7-ethylenedioxy-1,2,3,4,4a, 4b,5,6,7,8,10,10a - dodecahydrophenanthrene - 1,4 - diol (VIII) in 30 cc. of dry pyridine was combined with 3.0 g. of chromium trioxide in 30 cc. of pyridine and allowed to stand at room temperature overnight. Dilution with water followed by extraction with benzene-ether, washing, drying concentration and vacuum drying gave 2.90 g. of crude, non-crystalline product.

When this material was chromatographed over 90 g. of alkaline alumina, the benzene eluate gave Compound X, M. P. 113–118° C. with ether and ether-chloroform (1:1), there was eluted first Compound IX, M. P. 216–219° C. and finally Compound XVII, M. P. 130–138° C.

It was possible to obtain Compound XVIII from Compound VIII by reoxidation of the crude product obtained above with chromium trioxide-pyridine. Chromatography of this second stage oxidation product over alkaline alumina gave Compound X.

EXAMPLE 11

*Preparation of 4b - methyl - 7 - ethylenedioxy - 1,2,3,4,4a,-4b,5,6,7,8,10,10a - dodecahydrophenanthrene - 1 - ol-4-one (XIX)*

A solution of 98 mg. of Compound XVII in 5 cc. of 0.5 N potassium carbonate in 75% methanol was heated at reflux for three hours. Methanol was distilled and the product was collected in chloroform. Evaporation of the solvent gave a crystalline product, M. P. 113–116° C. Two recrystallizations from ether yielded Compound XIX melting at 117.5–118.5° C.

EXAMPLE 12

*Preparation of 4b - methyl - 7 - ethylenedioxy - 1,2,3,4,4a,-4b,5,6,7,8,10,10a - dodecahydrophenanthrene - 1,4-dione (XX), a stereoisomeric form of Compound X*

To the chromium trioxide-pyridine complex from 0.30 g. of chromium trioxide and 3 cc. of pyridine was added a solution of 270 mg. of Compound XIX in 3 cc. of pyridine. The mixture was left at room temperature for two hours and then was diluted with water and extracted with benzene. After removal of the solvent and vacuum drying of the residue, crystallization from ether gave product melting at 160–170° C. along with a small amount of unchanged starting material. The product was recrystallized 3 times from ether to obtain pure Compound XX, M. P. 171–172° C.

EXAMPLE 13

Preparation of 4b - methyl - 1,2,3,4,4a,4b,5,6,7,9,10,10a-dodecahydrophenanthrene-1-ol-4,7-dione (XXI)

To a solution of 227 mg. of Compound XVII in 5 cc. of acetone was added one drop of 10% hydrochloric acid. The solution was boiled for fifteen minutes and then diluted with water and the acetone distilled in vacuo. The aqueous suspension was extracted with chloroform and the chloroform solution was dried and evaporated to give crystalline Compound XXI, M. P. 118–123° C. Three recrystallizations from ether were used to prepare the pure product, M. P: 126–127° C.

EXAMPLE 14

Preparation of 4b-methyl - 1,2,3,4,4a,4b,5,6,7,9,10,10a-dodecahydrophenanthrene - 1,4,7 - trione (XXII), a stereoisomeric modification of Compound XI A solution of 140 mg. of Compound XXI in 5 cc. of 90% acetic acid was treated portionwise with cooled 1.4 cc. of 10% chromic acid in 90% acetic acid. After standing at room temperature for one and a half hours, the reaction mixture was diluted with water and extracted with four portions of chloroform. The chloroform solution was neutralized with excess sodium bicarbonate solution, washed with water and dried over anhydrous magnesium sulfate. Evaporation of the solvent gave crystalline product melting at 160–164° C. Three recrystallizations from benzene-ether (1:1) gave Compound XXII melting at 164–166° C.

EXAMPLE 15

Preparation of Compound XI by the isomerization of Compound XXII

Twenty-three milligrams of XXII in benzene solution was absorbed on two grams of alkaline alumina. After one hour, the material was eluted with ether-chloroform (1:1) giving crystals melting at 98–110° C. Two recrystallizations from ether gave 4b-methyl-1,2,3,4a,4b,5,6,7-9,10,10a - dodecahydrophenanthrene - 1,4,7 - trione (XI), melting point and mixed melting point of this product with another sample of Compound XI, 117–117.5° C.

EXAMPLE 16

Preparation of 4b - methyl - 7 - ethylenedioxy - 1,2,3,4,4a,-4b,5,6,7,8,10,10a - dodecahydrophenanthrene - 1,4 - diol (XIII), a stereoisomeric form of Compound VIII To 0.5 gram of lithium aluminum hydride in 25 cc. of dry tetrahydrofuran was slowly added with stirring a solution of 0.180 g. of Compound X in dry tetrahydrofuran. After stirring for one hour at room temperature, 2.0 cc. of water was added dropwise and the precipitated inorganic salts separated by filtration. Tetrahydrofuran was distilled leaving a crystalline residue. After several recrystallizations from acetone the product, Compound XIII, melted at 198–199.5° C.

Various changes and modifications may be made in carrying out the present invention without departing from the spirit and scope thereof. Insofar as these changes and modifications are within the purview of the annexed claims, they are to be considered as part of our invention.

We claim:

1. 4b - methyl - 1,2,3,4,4a,4b,5,6,7,9,10,10a - dodecahydrophenanthrene-1,4,7-trione.

2. The stereoisomeric form of 4b-methyl-1,2,3,4,4a,4b,-5,6,7,9,10,10a - dodecahydrophenanthrene - 1,4,7 - trione melting at about 117–117.5° C.

3. The stereoisomeric form of 4b-methyl-1,2,3,4,4a,4b,-5,6,7,9,10,10a - dodecahydrophenanthrene - 1,4,7 - trione melting at about 164–166° C.

4. 4b - methyl - 7 - ethylenedioxy - 1,2,3,4,4a,4b,5,6,7,-8,10,10a-dodecahydrophenanthrene-1,4-dione.

5. The stereoisomeric form of 4b-methyl-7-ethylenedioxy - 1,2,3,4,4a,4b,5,6,7,8,10,10a - dodecahydrophenanthrene-1,4-dione melting at about 120° C.

6. The stereoisomeric form of 4b-methyl-7-ethylenedioxy - 1,2,3,4,4a,4b,5,6,7,8,10,10a - dodecahydrophenanthrene-1,4-dione melting at about 171–172° C.

7. A dodecahydrophenanthrene compound from the group consisting of compounds of the formula

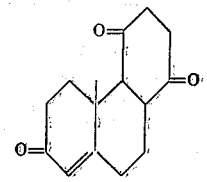

and 7-enol ether and 7-ketal derivatives thereof.

8. The process for preparing 4b - methyl - 1,2,3,4,4a,-4b,5,6,7,9,10,10a - dodecahydrophenanthrene - 1,4,7 - trione which comprises reacting 4b - methyl - 7 - ethylenedioxy - 1,2,3,4,4a,4b,5,6,7,8,10,10a - dodecahydrophenanthrene - 1,4 - diol with aluminum isopropoxide and cyclohexanone, recovering 4b - methyl - 7 - ethylenedioxy - 1,2,3,4,4a,4b,5,6,7,8,10,10a - dodecahydrophenanthrene - 1,4 - dione from the resulting reaction, and hydrolyzing said dione by heating with an acid.

9. The process for preparing 4b - methyl - 1,2,3,4,4a,-4b,5,6,7,9,10,10a - dodecahydrophenanthrene - 1,4,7 - trione which comprises reacting 4b - methyl - 7 - ethylenedioxy - 1,2,3,4,4a,4b,5,6,7,8,10,10a - dodecahydrophenanthrene - 1,4 - diol with pyridine-chromium trioxide complex in pyridine, recovering 4b - methyl - 7 - ethylenedioxy - 1,2,3,4,4a,4b,5,6,7,8,10,10a - dodecahydrophenanthrene - 1,4 - dione from the resulting reaction, intimately contacting said dione with an inorganic base, and hydrolyzing the resulting product by heating with an acid.

10. The process for preparing 4b - methyl - 1,2,3,4,4a,-4b,5,6,7,9,10,10a - dodecahydrophenanthrene - 1,4,7 - trione which comprises reacting 4b - methyl - 7 - ethylenedioxy - 1,2,3,4,4a,4b,5,6,7,8,10,10a - dodecahydrophenanthrene - 1,4 - diol with pyridine-chromium trioxide complex in pyridine, recovering 4b - methyl - 7 - ethylenedioxy - 1,2,3,4,4a,4b,5,6,7,8,10,10a - dodecahydrophenanthrene-1-ol-4-one from resulting reaction, hydrolyzing the recovered product by heating with an acid, intimately contacting the hydrolyzed product with chromium trioxide, and reacting the resulting oxidized product with an inorganic base.

11. The process for preparing 4b - methyl - 1,2,3,4,4a,-4b,5,6,7,9,10,10a - dodecahydrophenanthrene - 1,4,7 - trione which comprises reacting a member from the group consisting of 7-enol ether and 7-ketal derivatives of a compound of the formula

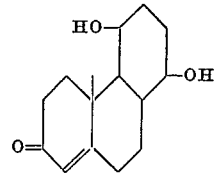

with an oxidizing agent, and hydrolyzing the resulting reaction product by heating with an acid.

12. The process for preparing a compound of the formula:

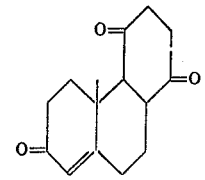

which comprises reacting 4b - methyl - 7 - ethylenedioxy - 1,2,3,4,4a,4b,5,6,7,8,10,10a - dodecahydrophenanthrene -

1,4 - diol with acetic anhydride in the presence of pyridine, oxidizing a pyridine solution of the resulting acetylated product with pyridine-chromium trioxide complex, to produce the corresponding 1,4-diol-1-acetate, hydrolyzing the resulting oxidized product with potassium carbonate, reoxidizing the resulting hydrolyzed product with pyridine-chromium trioxide complex in pyridine solution, and hydrolyzing the resulting oxidized product by heating with an acid.

13. The process for preparing a stereoisomeric form of 4b - methyl - 1,2,3,4,4a,4b,5,6,7,9,10,10a - dodecahydrophenanthrene - 1,4,7 - trione having a melting point of about 117° C. which comprises reacting a stereoisomeric form of this trione having a melting point of about 164–166° C. with an inorganic base.

14. The process for preparing a stereoisomeric form of 4b - methyl - 1,2,3,4,4a,4b,5,6,7,9,10,10a - dodecahydrophenanthrene - 1,4,7 - trione having a melting point of about 117° C. which comprises reacting a stereoisomeric form of this trione having a melting point of about 164–166° C. with alkaline alumina.

15. The stereoisomeric form of 4b - methyl - 7 - ethylenedioxy - 1,2,3,4,4a,4b,5,6,7,8,10,10a - dodecahydrophenanthrene - 1,4 - dione melting at about 146–148° C.

16. The process which comprises reacting a compound from the group consisting of 7-enol ether and 7-ketal derivatives of a compound of the formula

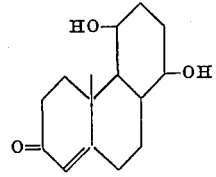

with an oxidizing agent to produce the corresponding derivatives of 4b - methyl - 1,2,3,4,4a,4b,5,6,7,9,10,10a - dodecahydrophenanthrene - 1,4,7 - trione.

References Cited in the file of this patent

UNITED STATES PATENTS

| | | |
|---|---|---|
| 2,302,636 | Koster et al. | Nov. 17, 1942 |
| 2,617,828 | Sarett et al. | Nov. 11, 1952 |

FOREIGN PATENTS

| | | |
|---|---|---|
| 235,431 | Switzerland | Apr. 16, 1945 |
| 235,485 | Switzerland | Apr. 16, 1945 |
| 235,487 | Switzerland | Apr. 16, 1945 |